No. 667,568. Patented Feb. 5, 1901.
W. H. PARDEE & J. H. MORGAN.
BOLT AND NUT LOCK.
(Application filed July 3, 1900.)

(No Model.)

WITNESSES:
Edw. Thorpe
Fred J. Hostitz

INVENTORS
William H. Pardee.
James H. Morgan.
BY
ATTORNEYS

THE NORRIS PETERS CO., PHOTO-LITHO., WASHINGTON, D. C.

UNITED STATES PATENT OFFICE.

WILLIAM H. PARDEE, OF ANTIGO, AND JAMES H. MORGAN, OF RHINELANDER, WISCONSIN.

BOLT AND NUT LOCK.

SPECIFICATION forming part of Letters Patent No. 667,568, dated February 5, 1901.

Application filed July 3, 1900. Serial No. 22,433. (No model.)

*To all whom it may concern:*

Be it known that we, WILLIAM H. PARDEE, a resident of Antigo, in the county of Langlade, and JAMES H. MORGAN, a resident of Rhinelander, in the county of Oneida, State of Wisconsin, citizens of the United States, have invented a new and Improved Bolt and Nut Lock, of which the following is a full, clear, and exact description.

The object of the invention is to provide a new and improved bolt and nut lock which is simple and durable in construction, very effective when in use, and arranged to prevent the nut from jarring loose.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in all the views.

Figure 1 is a side elevation of the improvement as applied. Fig. 2 is a sectional side elevation of the same. Fig. 3 is a similar view of the same with parts in position for removing the nut from the bolt. Fig. 4 is a perspective view of the forward end of the bolt, and Fig. 5 is a face view of the externally-threaded sleeve.

The improved device consists, essentially, of a bolt $A$, having a fixed head $A'$ and a shank $A^2$, extending through the parts $B$ $B'$ to be fastened together, a nut $C$ fitting loosely on the outer end of the shank, as is plainly shown in the drawings. The shank $A^2$ of the bolt $A$ is formed near its forward end with a reduced portion $A^3$, terminating in an elongated head $A^4$ of a length approximately equal to the diameter of the shank $A^2$ and of a width equal to the diameter of the reduced portion $A^3$. The head $A^4$ is adapted to pass through an elongated bore $D'$ in an externally-threaded sleeve $D$, arranged to screw on the thread $C'$ of the nut $C$ and pressed on at its inner end by a spring $E$, seated on an annular flange $C^2$, formed on the inner portion of the nut $C$. In the outer face of the sleeve $D$ is formed an elongated recess $D^2$, preferably at an angle to the bore $D'$ and adapted to receive the head $A^4$ when a quarter-turn is given to the nut and to the sleeve, as hereinafter more fully described.

When the sleeve $D$ is in an innermost position and it is desired to screw the nut $C$ against the outer face of the part $B'$, then the operator passes the nut $C$ upon the outer end of the bolt by swinging the head $A^4$ in register with the bore $D'$, and then pushing the nut $C$ inward, so that the head $A^4$ passes through the bore $D'$, (see Fig. 3,) and then a quarter-turn is given to the head $C$, so as to bring the recess $D^2$ in register with the head $A^4$, and by now moving the nut $C$ outward said head $A^4$ is seated in the recess $D^2$. The operator now turns the nut $C$, so that the latter screws inward on the sleeve $D$, which is now held against turning by the head $A^4$ engaging the recess $D^2$. The nut is now turned and screwed inward on the sleeve $D$ until the inner end of the nut is firmly seated against the face of the part $B'$. As the sleeve $D$ is firmly held in position on the head $A^4$ by the action of the spring $E$ it is evident that the several parts are firmly held in position, and consequently neither the bolt nor the nut is liable to be jarred loose. When it is desired to unscrew the nut and to remove the same from the bolt, the operator turns the nut $C$ in a reverse direction to cause the nut to screw outward on the sleeve $D$ until the said sleeve is in an innermost position, and then the operator pushes the nut $C$ inward, so as to disengage the head $A^4$ from the recess $D^2$. When this has been done, the operator gives a quarter-turn to the nut, so as to bring the head $A^4$ in register with the bore $D'$, and then the operator can pull the nut $C$, the sleeve $D$, and the spring $E$, contained in the nut, from the bolt.

From the foregoing it is evident that the device is very simple and durable in construction and is arranged to securely hold the parts in position and prevent the nut from jarring loose.

Having thus fully described our invention, we claim as new and desire to secure by Letters Patent—

1. A nut and bolt lock, comprising a bolt having a reduced portion and an elongated head thereon, a nut having an inner thread, and a threaded sleeve screwing in the nut and having an elongated bore for the passage of said head and reduced portion, and also having an elongated recess at the outer end at an angle to said bore, for engagement by said head to permit of holding the sleeve against turning in the nut when the latter is turned, as set forth.

2. A nut and bolt lock, comprising a bolt having a reduced portion and an elongated head thereon, a nut having an inner thread, a threaded sleeve screwing in the nut and having an elongated bore for the passage of said head and reduced portion, and also having an elongated recess at the outer end at an angle to said bore, for engagement by said head to permit of holding the sleeve against turning in the nut when the latter is turned, and a spring in the nut for pressing said sleeve, as set forth.

3. A nut-lock having a nut, an externally-threaded sleeve screwing in said nut and having an elongated bore, and an elongated recess at the outer end at an angle to said bore, as set forth.

4. A nut-lock having a nut, an externally-threaded sleeve screwing in said nut and having an elongated bore, an elongated recess at the outer end at an angle to said bore, and a spring seated in said nut and pressing against the inner end of said sleeve, as set forth.

In testimony whereof we have signed our names to this specification in the presence of the subscribing witnesses.

WILLIAM H. PARDEE.
JAMES H. MORGAN.

Witnesses as to signature of William H. Pardee:
H. F. MORSON,
F. E. JUDSON.

Witnesses as to signature of James H. Morgan:
G. W. PURVIS,
CHRISTOPHER HANSON.